United States Patent [19]

Watanabe et al.

[11] Patent Number: 4,915,717
[45] Date of Patent: Apr. 10, 1990

[54] METHOD OF FABRICATING OPTICAL FIBER PREFORMS

[75] Inventors: Minoru Watanabe; Naoki Yoshioka; Hiroo Kanamori, all of Kanagawa; Nobuo Inagaki, Ibaraki, all of Japan

[73] Assignees: Tokyo Nippon Telegraph Public Corporation; Sumitomo Electric Industries, Ltd., both of Osaka, Japan

[21] Appl. No.: 577,405

[22] Filed: Feb. 6, 1984

[51] Int. Cl.$^4$ .................................... C03B 37/018
[52] U.S. Cl. ........................................ 65/3.12; 65/1; 65/144
[58] Field of Search ............... 65/3.12, 18.2, 1, 144

[56] References Cited

U.S. PATENT DOCUMENTS

| | | | |
|---|---|---|---|
| 4,062,665 | 12/1971 | Izawa et al. | 65/3.12 |
| 4,345,928 | 8/1982 | Kawachi et al. | 65/3.12 |
| 4,367,085 | 1/1983 | Suto et al. | 65/3.12 |
| 4,414,012 | 11/1943 | Suto et al. | 65/3.12 |
| 4,465,708 | 8/1984 | Fanucci et al. | 65/3.12 |

FOREIGN PATENT DOCUMENTS

| | | | |
|---|---|---|---|
| 151625 | 11/1979 | Japan | 65/18.2 |
| 07508 | 1/1980 | Japan | 65/18.2 |
| 19059 | 4/1982 | Japan | 65/3.12 |
| 92532 | 6/1982 | Japan | 65/3.12 |

OTHER PUBLICATIONS

Sudo et al, "Refractive-Index Profile Control Techniques in the Vapor-Phase Axial Deposition Method", Transaction of the IECE of Japan, vol. E64, No. 8, Aug. 1981, pp. 536-543.

Primary Examiner—Kenneth M. Schor
Attorney, Agent, or Firm—Sughrue, Mion, Zinn, Macpeak & Seas

[57] ABSTRACT

An improved method for fabricating an optical fiber preform by the vapor phase axial deposition (VAD) method, comprises forming core and cladding soots at the same time by the use of core and cladding burners. The improvement is that the cladding burner is designed so that at least one of the outlets for a feed material gas, a fuel gas, an auxiliary fuel gas, and an inert gas is composed of a plurality of openings. In this improved method, the temperature distribution from the boundary of the core soot to the periphery of the cladding soot is made smooth, and thus the cladding soot is prevented from cracking.

8 Claims, 1 Drawing Sheet

METHOD OF FABRICATING OPTICAL FIBER PREFORMS

FIELD OF THE INVENTION

The present invention relates to a method of fabricating optical fiber preforms. More particularly, it relates to improvements in the fabrication of optical fiber preforms by the vapor phase axial deposition method (VAD).

BACKGROUND OF THE INVENTION

Various techniques have been developed for the fabrication of optical fiber preforms, including the double crucible method, the modified chemical vapor deposition method (MCVD), and the vapor phase axial deposition (VAD) method. The present invention is intended to provide an improved VAD method.

The VAD method can be carried out in various ways: for example, (1) a core soot is first formed and then converted into a transparent glass layer and, thereafter, it is covered with a silica tube, (2) a core soot is formed and converted into a transparent glass layer and, thereafter, a cladding is formed by the outside deposition method, or (3) core and cladding soots are simultaneously formed and then made transparent. The present invention is directed to, in particular, improvements of the third or simultaneous method as described above.

The simultaneous method is widely employed in the fabrication of soots for single mode fibers having a small core diameter as well as for graded-index fibers having a quadratic refractive index distribution. One difficulty encountered in performing the simultaneous method is that the cladding soot is breakable at the time of its formation or at the subsequent sintering stage of the preform including the core and cladding.

As a result of extensive investigations to overcome the above described problem, it has been found that the cladding soot is breakable for the reason that the temperature distribution from the inner boundary of the core soot to its outer periphery next to the cladding soot is not smooth as described hereinafter in detail. That is, if a spot where the core deposition temperature is lower is present inside the outer core periphery, the bulk density of the spot is lower than the surrounding area. This spot having a lower bulk density contracts when, after core deposition, it is heated to a temperature higher than the core deposition temperature by a flame of a burner for the formation of the cladding. The burners for use in the formation of the core and cladding are hereinafter referred to as core and cladding burners, respectively. Since the coefficient of contraction of the spot is higher than those spots where the deposition temperature and the bulk density are high, tensile force is exerted thereon, resulting in the formation of cracks. The formation of cracks at the sintering stage occurs for the same reason as described above.

Referring to FIG. 1, there is shown schematically a conventional method of forming core and cladding soots at the same time using core and cladding burners. In this case, a soot is formed using a core burner 4 and cladding burners 2 and 3. The temperature distribution of the soot surface formed by the conventional method of FIG. 1 is shown in FIG. 2. It can be seen from FIG. 2 that a spot where the deposition temperature is lower is present inside the core periphery and thus the temperature distribution from the inner boundary of the core soot to the outer periphery of the cladding soot is not smooth. In FIG. 2, T indicates a temperature and r indicates a distance from the center of the soot.

SUMMARY OF THE INVENTION

An object of the invention is to provide an improved method for fabricating optical fiber preforms whereby a smooth temperature distribution is produced and thus the cladding soot is prevented from cracking.

It has been found that the object is attained by using a cladding burner designed so that at least one of the outlets for a feed material, a fuel gas, an auxiliary fuel gas, and an inert gas is an outlet composed of a plurality of openings.

DETAILED DESCRIPTION OF THE INVENTION

The method of the invention utilizes a cladding burner designed so that at least one of the outlets for a feed material gas, a fuel gas, an auxiliary fuel gas, and an inert gas is made up of a plurality of openings. Thus, by controlling the flow rate of each gas from the outlet, the temperature distribution of the soot surface can be easily controlled.

The invention is particularly useful for fabricating an optical fiber preform that is to have a core of a given refractive index distribution in the radial direction and a cladding having a constant refractive index. A cylindrical body is used as a base for deposition. The core is formed by feeding a core material gas and fuel gases such as oxygen and hydrogen through a core burner. The hydrogen burns with the core material gas to form fine glass particles by flame hydrolysis. These particles are sent onto the rotating cylindrical body and are deposited thereon. The effect is to grow the particles in the axial direction on the exterior of the rotating member to thereby form a core soot. Simultaneously with the forming of the core soot, various fuel gases and possibly inert gases are fed through the cladding burner of this invention. The hydrogen gas is burnt with the cladding material gas to form fine glass particles by flame hydrolysis. The fine glass particles of the cladding material are sent onto the recently deposited core soot and are deposited thereon to a predetermined thickness to thereby form a cladding soot. Finally, the cylindrical member along with the deposited core and cladding soots are sintered to produce the desired optical fiber preform.

Figure 1:
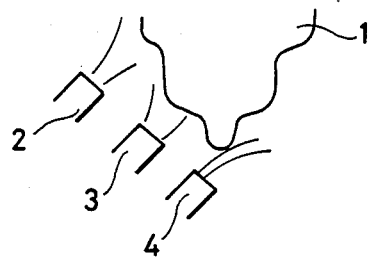
FIG. 1 illustrates schematically the conventional method of fabricating a soot using core and cladding burners.
Figure 2:
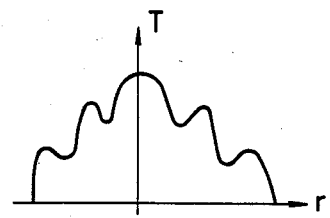
FIG. 2 shows the temperature distribution of the soot surface formed by the conventional method of FIG. 1.
Figure 3:
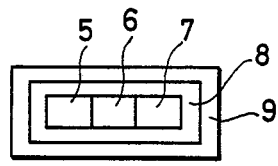
FIGS. 3, 4, 5 and 6 are each a top view of different embodiments of the cladding burner which is used in the present invention.
Figure 4:
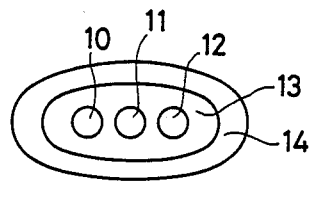

In FIG. 3 is shown an example of a cladding burner which can be used in the present invention. Three square outlets 5, 6 and 7 are arranged contiguously and linearly as inner outlets. Surrounding the inner outlets is a rectangular middle outlet 8 and surrounding the middle outlet 8 is a rectangular outer outlet 9. Another example is shown in FIG. 4 in which three circular outlets 10, 11 and 12 are arranged linearly but not touching. An oval middle outlet 13 surrounds individually and collectively the inner inlets 10, 11 and 12 and an oval outer outlet 14 surrounds the middle outlet 13. In the example shown in FIG. 5, the inner outlets comprise two contiguous half-oval outlets 15 and 16 and two surrounding half-oval outlets 17 and 18. Two half-oval middle outlets 19 and 20 surround the inner outlets 17 and 18 and two half-oval outer outlets 21 and 22 surround the middle outlets 19 and 20. In the final example of FIG. 6, the inner outlets 27, 28 and a middle outlet 26 have similar shapes to the corresponding outlets shown in FIG. 3. However, the rectangular outer outlet is divided into several outlets 23, 24, 25 and 30. In the simplest use of the embodiments of FIGS. 3–6, the inner outlets are used for a feed material gas, a hydrogen gas, or a gas mixture of feed material and hydrogen. The middle outlets are used for an inert gas and the outer outlets are used for an auxiliary fuel gas such as oxygen.

Figure 7:
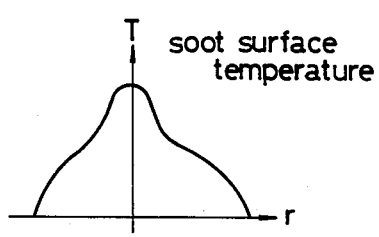
FIG. 7 shows the temperature distribution of the soot surface formed by the method of the invention.

The desired temperature distribution of, the soot surface formed by the method of the invention using the above described cladding burners is shown in FIG. 7.

Figure 5:
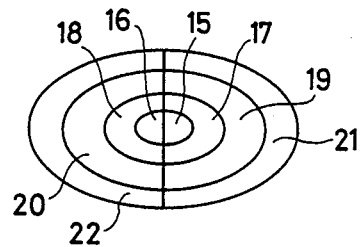
Figure 6:
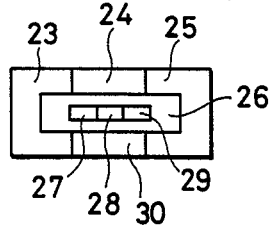

In the cladding burners of FIGS. 3, 5 and 6, a plurality of feed material gas outlets are adjacent to each other. On the other hand, in the cladding burner of FIG. 4, a plurality of feed material gas outlets are spaced apart some distance from each other. With the use of adjacent inner outlets containing flows of feed material, as shown in FIGS. 3, 5 and 6, the temperature distribution is prevented from becoming discontinuous at the boundaries between the feed material gas flows.

In the burners of FIGS. 3, 5 and 6, however, irregularities are sometimes formed in the soot at points corresponding to the boundaries between the inner and middle outlets. The formation of such irregularities can be eliminated by an alternate use of the burner of FIG. 4, in which the temperature distribution can be made smooth or uniform. The inner outlets 10, 11 and 12 are used for the cladding mater gas and the fuel gas such as hydrogen. The middle outlet 13 is used for either the fuel gas, the auxiliary fuel gas such as oxygen or an inert gas. If hydrogen flows through the middle outlet 13, then oxygen must flow through the outer outlet 14. However, if oxygen flows through the middle inlet 13, then the outer outlet 14 must be used for hydrogen. The effect is to have another gas flow from the middle outlet 13 flowing between the individual inner outlets 10, 11 and 12. The individual flow rates of the core material gas, the fuel gas, the auxiliary fuel gas and possibly the inert gas are separately controlled to provide the desired temperature profile.

The inner outlets 10, 11 and 12 can be individually controlled with different gas mixtures and different flow rates. For instance, the inner outlet 10 can be used for a flow of hydrogen or inert gas but with no feed material present, while the inner outlet 11 can be used for flowing a combination of feed material or hydrogen. Other possible combinations of flow mixtures and flow rates are included within this invention.

In the burner of FIG. 5, all the inner, middle and outer outlets for feed material, fuel, auxiliary fuel, and inert gases are made up of a plurality of openings. In the burner of FIG. 6, the inner outlets 27, 28 and 29 for feed material and possibly fuel gas are made up of a plurality of openings.

The present invention is not limited to the above described embodimetns. In addition, other embodiments can be employed. It can be determined appropriately which gas outlet should should be made up of a plurality of openings. For example, an embodiment in which the feed material gas outlet is made up of a single opening a plurality of openings, and the fuel gas outlet is made up of a plurality of openings. An example of another embodiment is one in which the inner feed material gas outlet is made up of a single opening or a plurality of openings, and the outer auxiliary fuel gas outlet is made up of a plurality of openings. Yet a further embodiment is one in which the inner feed material gas outlet is made up of a single opening or a plurality of openings, and the middle inert gas outlet is made up of a plurality of openings.

In accordance with the above described embodiments, the temperature distribution is controlled by utilizing the gases other than the feed material gas. As the flow rate of the fuel gas, such as a hydrogen gas, is increased, the temperature rises, but the flame becomes greater in diameter. As the auxiliary fuel gas, such an oxygen, is increased, the flame becomes smaller in diameter and the temperature rises. As the flow rate of the inert gas increases, the flame becomes smaller in diameter and the temperature drops.

Furthermore, depending on the positional relation between the burner and the soot, the thickness of the soot, and the fabrication conditions, the temperature distribution can be controlled by controlling the flow rates of the fuel gas, the inert gas, and the auxiliary fuel gas from a plurality of openings. Alternatively, the soot can be fabricated in a smooth form by individually controlling the flow rates of the feed material gas through a plurality of openings.

The following example is given to illustrate the present invention in greater detail.

EXAMPLE

For the fabrication of a preform for a single mode fiber, having a core diameter of 9 $\mu$m and an outer diameter of 125 $\mu$m, a soot is needed with a soot core diameter of 9 mm and an outer diameter of 193 $\mu$m. However, even if two or three conventional cladding burners having only one feed material gas outlet were used, it has been difficult to fabricate a soot having a diameter larger than 100 $\mu$m since the temperature distribution of the soot is made discontinuous by the presence of overlapping flames.

On the other hand, when a cladding is formed by the use of one burner as shown in FIG. 6, the temperature distribution of the soot is made smooth by controlling the flow rate of gas from the outlet, whereby there could be formed a soot having an outer diameter of up to 200 $\mu$m.

We claim:

1. A method for fabricating an optical fiber preform consisting of a core having a given refractive index distribution in the radial direction and a cladding having a constant refractive index, comprising the steps of:
   feeding a core material gas and a fuel gas through a core burner;
   burning the hydrogen to form glass particles by flame hydrolysis;
   sending said glass particles onto a rotating member to deposit said particles thereon, thereby growing said particles in the axial direction on said member to form a core soot; and
   simultaneously with said feeding, burning and sending steps, feeding a cladding material gas and fuel gas through a cladding burner, separate from said core burner, burning the hydrogen gas to form glass particles by flame hydrolysis with said cladding material gas, sending said cladding particles onto the core soot, and depositing said cladding particles to a predetermined thickness to form a cladding soot;

wherein said cladding burner is designed so that at least one of the outlets for said (1) cladding feed material gas, (2) said fuel gas, (3) an auxiliary fuel gas, and (4) an inert gas is an outlet composed of a plurality of openings adjacent to each other.

2. The method as claimed in claim 1, wherein the outlet for the fuel gas is composed of a plurality of openings.

3. The method as claimed in claim 1, wherein the outlet for the inert gas is composed of a plurality of openings.

4. The method as claimed in claim 1, wherein the outlet for the inert gas surrounds said plurality of openings and is surrounded by one of the outlets for the fuel gas and the auxiliary fuel gas, and cladding feed material being conveyed through said plurality of openings.

5. An apparatus for fabricating an optical fiber prefrom consisting of a core having a given refractive index distribution in the radial direction and a cladding having a constant refractive index, comprising:

first feeding means for feeding a core material gas and a fuel gas through a core burner;

means for burning the hydrogen to form glass particles by flame hydrolysis;

means for sending said glass particles onto a rotating member to deposit said particles thereon, thereby growing said particles in the axial direction on said member to form a core soot; and second feeding means, operating simultaneously with the operation of said first feeding means, burning means and sending means, for feeding a cladding material gas and a fuel gas through a cladding burner, separate from said core burner, and for burning the hydrogen gas to form glass particles by flame hydrolysis with said cladding material gas, for sending said cladding particles onto the core soot, and for depositing said cladding particles to a predetermined thickness to form a cladding soot; and wherein said cladding burner is designed so that at least one of the outlets for said cladding feed (1) cladding feed material gas (2) said fuel gas, (3) an auxiliary fuel gas, and (4) an inert gas is an outlet composed of a plurality of openings adjacent to each other.

6. The apparatus as claimed in claim 5, wherein the outlet for the fuel gas is composed of a plurality of openings.

7. The apparatus as claimed in claim 5, wherein the outlet for the inert gas is composed of a plurality of openings.

8. The apparatus as claimed in claim 5, wherein the outlet for the inert gas surrounds said plurality of openings and is surrounded by one of the outlets for the fuel gas and the auxiliary fuel gas, and cladding feed material being conveyed through said plurality of openings.

* * * * *